(12) United States Patent
Galeev et al.

(10) Patent No.: US 7,393,149 B2
(45) Date of Patent: Jul. 1, 2008

(54) COMPACT INPUT DEVICE FOR ENTERING DATA

(75) Inventors: Mikhail T. Galeev, Palatine, IL (US);
Thomas E. Gitzinger, Palatine, IL (US);
Paul R. Steuer, Hawthorn Woods, IL (US)

(73) Assignee: Motorola, Inc., Schaumburg, IL (US)

( * ) Notice: Subject to any disclaimer, the term of this patent is extended or adjusted under 35 U.S.C. 154(b) by 427 days.

(21) Appl. No.: 11/205,922

(22) Filed: Aug. 17, 2005

(65) Prior Publication Data

US 2007/0041770 A1 Feb. 22, 2007

(51) Int. Cl.
*G06F 3/023* (2006.01)
*B41J 5/10* (2006.01)

(52) U.S. Cl. ........................................ 400/489; 400/472
(58) Field of Classification Search ................ None
See application file for complete search history.

(56) References Cited

U.S. PATENT DOCUMENTS

| | | | |
|---|---|---|---|
| 3,937,939 A | | 2/1976 | Frenkel |
| 4,029,915 A | | 6/1977 | Ojima |
| 4,128,889 A | | 12/1978 | Ojima et al. |
| 4,352,310 A | | 10/1982 | Orlandoni |
| 5,733,056 A | * | 3/1998 | Meagher ................ 400/472 |
| 5,754,645 A | | 5/1998 | Metroka et al. |
| 6,059,470 A | * | 5/2000 | Myint .................... 400/488 |
| 6,744,427 B2 | | 6/2004 | Maglio et al. |
| 2003/0147205 A1 | | 8/2003 | Murphy |
| 2004/0046733 A1 | * | 3/2004 | Forlenza et al. ........ 345/156 |
| 2004/0090417 A1 | | 5/2004 | Amiri |
| 2004/0164954 A1 | | 8/2004 | Rekimoto |
| 2004/0264851 A1 | | 12/2004 | Amiri |
| 2005/0070324 A1 | | 3/2005 | Chadha |
| 2005/0105951 A1 | * | 5/2005 | Risheq .................... 400/472 |

FOREIGN PATENT DOCUMENTS

| | | |
|---|---|---|
| DE | 2519385 A1 | 11/1975 |
| DE | 29804683 U1 * | 5/1998 |
| DE | 20317865 U1 | 3/2004 |

(Continued)

OTHER PUBLICATIONS

Machine translation of JP 2004-192258 to Honda from Japanese Patent Office website; Jul. 8, 2004.*

(Continued)

*Primary Examiner*—Daniel J Colilla
(74) *Attorney, Agent, or Firm*—Sylvia Chen (57) ABSTRACT

A compact input device (104), suitable for entering data in an electronic device (102), includes a cylindrical surface (202) that has a keyboard switch matrix (210) deployed on the outer body of the cylindrical surface (202) formed by a first extendable interlocking part (402) and a second extendable interlocking part (404). The first extendable interlocking part (402) includes a left half of a QWERTY keyboard (e.g., Q, W, E, R, T) while the second extendable interlocking part (404) includes a right half of a QWERTY keyboard (e.g., Y, U, I, O, P). When the compact input device (104) is in an extended and aligned configuration, the keys of the first extendable interlocking part (402) and the keys of the second extendable interlocking part (404) form a common QWERTY keyboard configuration.

19 Claims, 7 Drawing Sheets

FOREIGN PATENT DOCUMENTS

| | | | |
|---|---|---|---|
| EP | 1197832 | A2 | 4/2002 |
| EP | 1197832 | A3 | 3/2005 |
| JP | 07005965 | A * | 1/1995 |
| JP | 2000231435 | A * | 8/2000 |
| JP | 2004192258 | A * | 7/2004 |
| WO | 2001084722 | A2 | 11/2001 |
| WO | 2003058394 | A2 | 7/2003 |

OTHER PUBLICATIONS

Leap Frog; Turbo Twist® Spelling Handheld; http://www.leapfrog.com/do/findproduct?ageGroupKey=grade&key=ttspelling 2001-2005 LeapFrog Enterprises, Inc.; 2 pages.

John W. Mckown; Yet Another One-Hand Keyboard; http://www.chordite.com; 4 pages, date unknow.

High Technology Finland 2004; New Materials and Processes; http://www.hightechfinland.com/2004/newmaterialsprocess/screentec.html 2 pages.

Earl L. Decker, David J. Ziemkiewicz and Joseph R. Ross; Concept to Production: Continuous Surface Keypad Switch; SAE Technical Paper Series 1999-01-0413; 7 pages, date unknown.

Alternative Keyboard Gallery: TouchEasy Keyboard; TouchEasy Ergonomic Keyboard; http://tim.griffins.ca/gallery/keyboard/TouchEasy.html 1 page, date unknown.

Sure Grip Controls, Handle Accessories 10 Button Keypad; http://www.suregripcontrols.com/products_acc_gen6.html 1 page, date unknown.

* cited by examiner

COMPACT INPUT DEVICE FOR ENTERING DATA

FIELD OF THE INVENTION

This invention relates in general to the field of electronic devices, and more specifically, to an accessory for entering data in an electronic device.

BACKGROUND OF THE INVENTION

With an increase in the use of electronic devices such as mobile phones, pagers, personal digital assistants (PDAs), and so forth, electronic devices are being increasingly designed in small sizes so that users can carry them easily. One of the common features of electronic devices is data entry. With the reduction in the size of electronic devices, however, existing data entry methods and mechanisms have been modified either to suit the reduced size of the portable electronic devices or are full-sized accessories.

Several methods, such as using a virtual keypad and handwriting character recognition, involve the use of touch-screen technology. A virtual keyboard, however, utilizes valuable screen area while handwriting recognition requires learning either on the part of the user or the electronic device software. Other methods use a numeric keypad (with or without predictive text entry), a reduced-size alphanumeric keypad, alternate key-types such as a thumbwheel or joystick, and a full-size external alphanumeric keyboard that is attached or wirelessly connected to the electronic device.

With the continued adoption of portable communication devices that support text messaging and electronic mail features, it becomes more and more important to have input devices that are compact and yet easy to use. Thus, there are opportunities to develop additional data entry mechanisms for electronic devices.

BRIEF DESCRIPTION OF THE FIGURES

The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE EMBODIMENTS

Various embodiments of the present invention describe a compact input device for entering data in an electronic device. The compact input device includes a generally cylindrical surface. The cylindrical surface has a keyboard switch matrix having more than one row and more than one column deployed on its outer body. The cylindrical surface includes extendable interlocking parts, which extend and align to form a QWERTY keyboard. This compact input device uses a wireless connection to enter data in an electronic device. When the input device is in its compact configuration, it is small and a navigational element is easily used. When the input device is in its extended and aligned configuration, the compact input device is larger and easily recognizable as a QWERTY keypad.

Before describing in detail a particular example of a compact input device in accordance with the present invention, it should be observed that the present invention resides primarily in apparatus components related to input devices. Accordingly, the apparatus components have been represented where appropriate by conventional symbols in the drawings, showing only those specific details that are pertinent to understanding the present invention so as not to obscure the disclosure with details that will be readily apparent to those of ordinary skill in the art having the benefit of the description herein.

Figure 1:
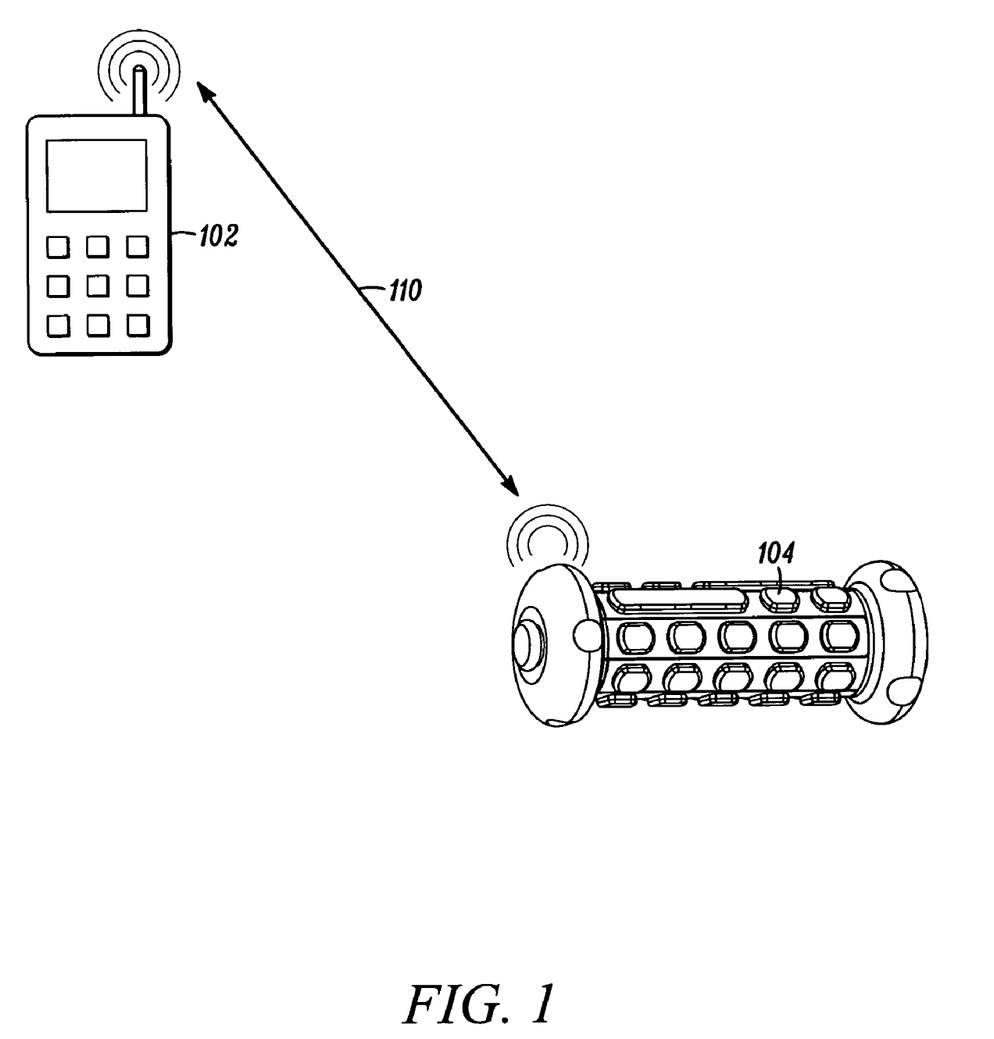
FIG. 1 illustrates a wireless communication between a mobile device and an example of a compact input device in accordance with an embodiment.

FIG. 1 illustrates a wireless communication between an electronic device 102 and an exampled of a compact input device 104 in accordance with an embodiment. The electronic device 102 is illustrated as mobile phone with text messaging capabilities; however, the electronic device can also be implemented as a pager, a personal digital assistant (PDA), a computer, a remote controller, a handheld game, and so forth. The compact input device 104 is used for entering data in the electronic device 102. The compact input device 104 will be described in more detail with reference to the following drawings. The compact input device 104 communicates with the electronic device 102 using a wireless link 110 such as Bluetooth®, a wireless local area network in accordance with one of the IEEE 802.xx standards, an infrared link, or a radiofrequency link.

Figure 2:
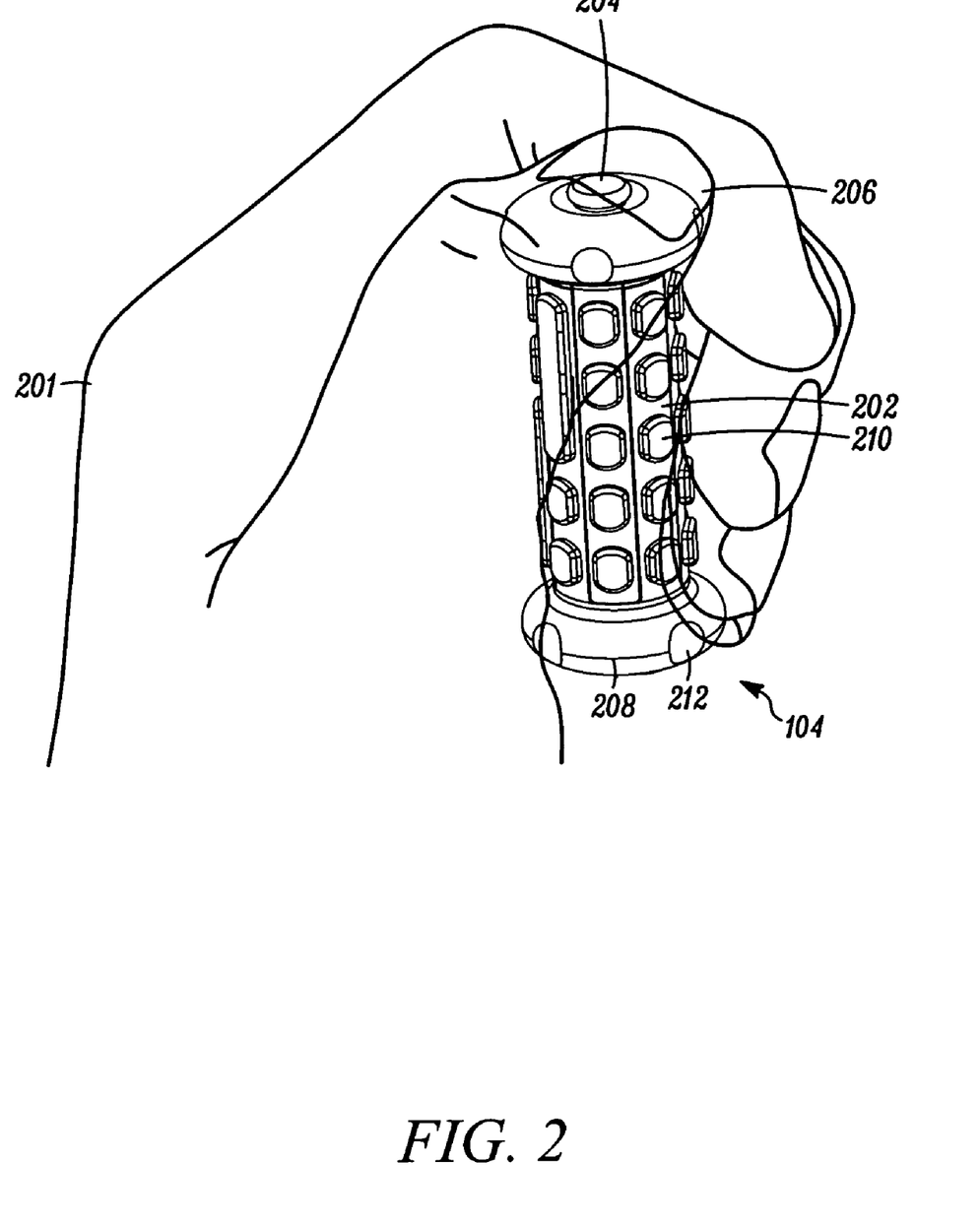
FIG. 2 is a view of the compact input device shown in FIG. 1 being held by a user, in accordance with an embodiment.

FIG. 2 is a view of the compact input device 104 shown in FIG. 1 being held by a hand 201 of a user, in accordance with an embodiment. The compact input device 104 is used for navigating and for entering data in the electronic device 102 (shown in FIG. 1). The input device 104 includes a cylindrical surface 202 with a keyboard switch matrix 210 deployed on the external side of the cylindrical surface 202. The input device 104 further includes a navigation element 204.

The cylindrical surface 202 shown has a circular cross-section, but alternate embodiments may have a slightly elliptical cross-section. The compact input device 104 further includes a first end-cap 206 and a second end-cap 208 at the ends of the cylindrical surface 202. In accordance with an embodiment, the first end-cap 206 and the second end-cap 208 are provided with a plurality of indentations, for example, indentation 212, for a better grip on the input device 104. The compact input device 104 also includes a microcontroller, a transmitter, and a power source, which will be shown in more detail later. The microcontroller, transmitter and other elements of the input device 104 are powered by the power source. The microcontroller decodes the signal generated when a key of the keyboard switch matrix 210 is pressed. An example microcontroller is a low-power 8-bit microcontroller.

The keyboard switch matrix 210 is deployed on the outer body of the cylindrical surface 202, which is the convex side of the cylindrical surface 202. The keyboard switch matrix 210 includes keys such as letters, numerals, special characters, function keys, and so forth. In this embodiment, the keys on the keyboard switch matrix 210 generally correspond to the configuration of keys on a QWERTY keyboard with a few modifications to better optimize the compact input device 104. By basing the keyboard switch matrix 210 on the QWERTY keyboard configuration, data entry is facilitated when a user is already familiar with the QWERTY key layout.

In this embodiment, the navigation element 204 is in the form of a short joystick having a push-to-select feature. The navigation element 204 may be used for functions such as navigating a cursor, selecting, scrolling, etc. Alternate or additional navigation elements include up-down and/or right-left buttons, a touchpad, a knob, and a scroll-and-select mechanism such as soft-keys or a thumbwheel. In accordance with an embodiment, the navigation element 204 includes an 'enter' feature used for a selection function. In accordance with another embodiment, the navigation element 204 is a rotatable knob at the first end-cap 206. The compact input device 104 may include a plurality of navigation elements, depending on the functional requirements of the compact input device 104. Additional or alternate navigation elements can be positioned at the first end-cap 206, at the second end-cap 208, and at any point on or along the cylindrical surface 202.

Figure 3:
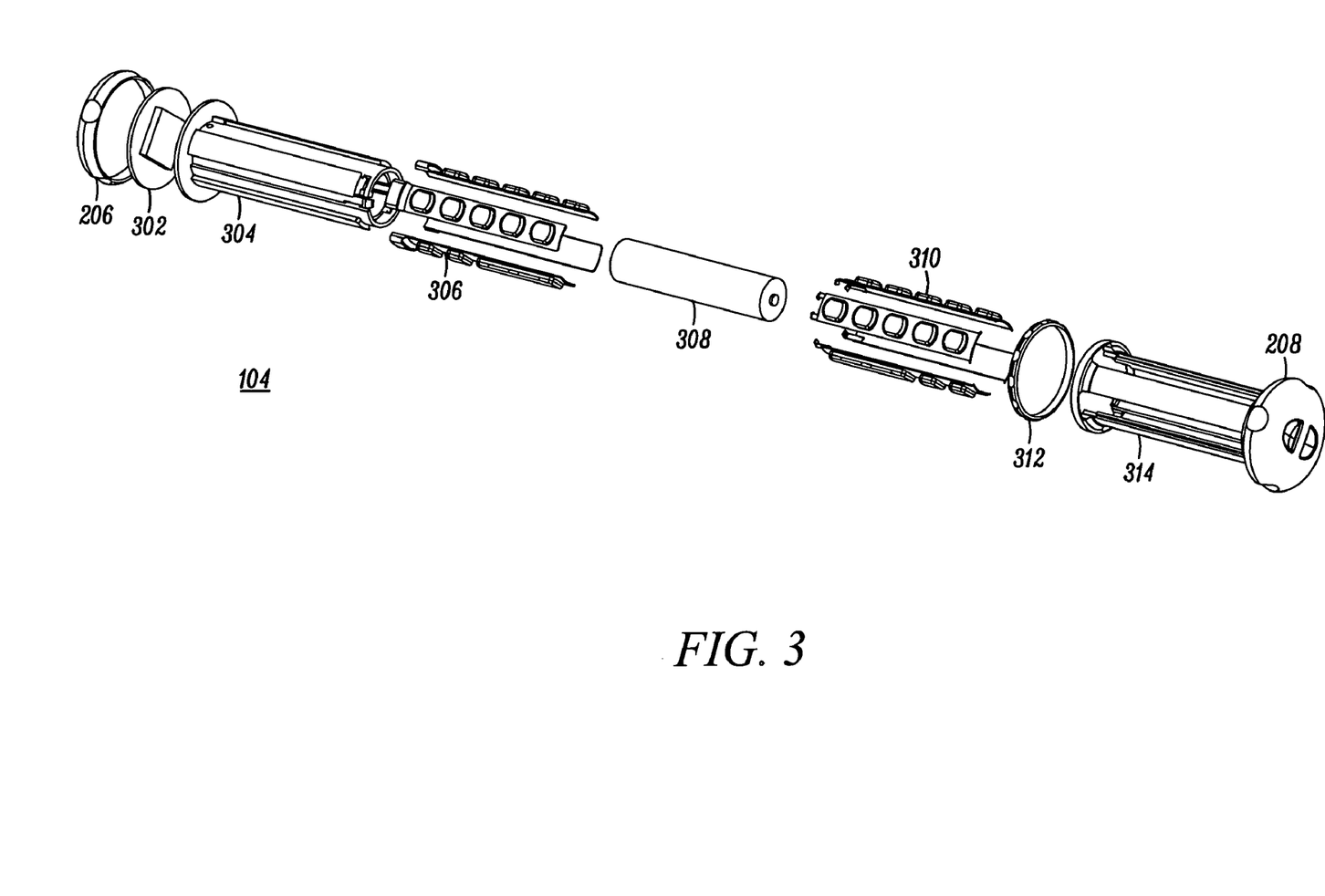
FIG. 3 is an exploded view of the compact input device shown in FIG. 1, in accordance with an embodiment.

FIG. 3 is an exploded view of the compact input device 104 shown in FIG. 1, in accordance with an embodiment. In addition to the first end-cap 206 and the second end-cap 208 described previously, the compact input device 104 includes a circuit board 302, a first sleeve 304, a first keycap set 306, a battery 308, a second keycap set 310, a rotational ring 312, and a second sleeve 314. In this embodiment, the first end-cap 206 retains the circuit board 302 and houses the navigation element 204 (shown in FIG. 2). In addition, the first end-cap 206 provides a handle for the user. The circuit board 302 includes circuitry, a wireless communication unit, a microcontroller, and power control. The wireless communication unit is used for transmitting data wirelessly to the electronic device 102. Examples of the wireless communication unit include a Bluetooth® communication unit, a wireless local area network communication unit, a radio frequency communication unit, and an infrared communication unit. The microcontroller decodes the signal generated when a key of the keyboard switch matrix 210 is pressed, and transmits an American Standard Code for Information Interchange (ASCII) code of the character to the electronic device 102 using the wireless communication unit. The transmission of the ASCII code is through a transmitter of the circuit board 302. Upon receiving the ASCII code, an application of the electronic device 102 (shown in FIG. 1), for example, an operating system, displays the character for visual confirmation by the user.

The first sleeve 304 is attached to the first end-cap 206, retains the circuit board 302 and the battery 308, and provides a mounting surface for the keys. Similarly, the second sleeve 314 is attached to the second end-cap 208. Further, the first sleeve 304 includes electrical contacts that connect to electrical contacts located on the second sleeve 314 when the compact input device 104 is in an extended configuration, which will be described later. The first keycap set 306 and the second keycap set 310 contain individual keys, routing circuitry, and pad surfaces for operation of the input device 104.

In accordance with various embodiments, the first keycap set 306 and the second keycap set 310 are domes with rigid keys, domes with flexible keys (such as elastomer rubber keys), or rubber-like material keys with graphite for completing an electrical circuit. The first keycap set 306 and the second keycap set 310 may alternately be touchpads. Examples of the touchpads include resistive touchpads, capacitive touchpads, and surface acoustic-wave touchpads. The battery 308 supplies power to the compact input device 104. In accordance with various embodiments, the battery 308 is a standard removable battery, such as a 1.5 Volt AA or AAA alkaline or rechargeable battery. If a smaller battery is desired, the AA or AAA battery shown can be replaced by a watch-type or hearing-aid-type battery and positioned under the second end-cap 208.

The rotational ring 312 is a supplementary navigational element, which may rotate clockwise and counter-clockwise for up/down for menu navigation when the compact input device 104 is in an extended configuration. When the compact input device 104 is in a compact configuration, the rotational ring 312 is nested close to the first end-cap 206.

Figure 4:
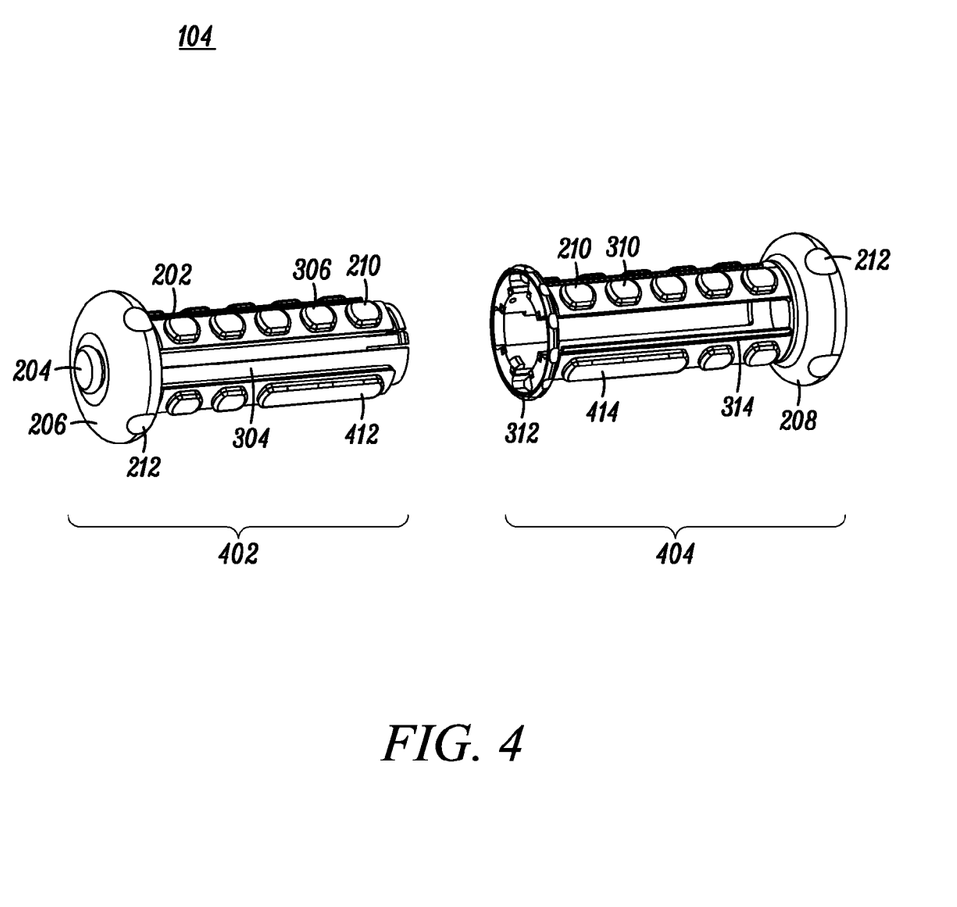
FIG. 4 is a partially assembled view of the compact input device shown in FIG. 1, in accordance with an embodiment.

FIG. 4 is a partially assembled view of the compact input device 104 shown in FIG. 1, in accordance with an embodiment. The generally cylindrical surface 202 of the input device 104 is formed by a plurality of extendable interlocking parts, for example, a first extendable interlocking part 402 and a second extendable interlocking part 404. In this view, it is clear that the first end-cap 206 with a navigation element 204, the circuit board 302 (shown in FIG. 3), the first sleeve 304, and the first keycap set 306 combine to form the first extendable interlocking part 402. Similarly the second end-cap 208, the second sleeve 314, the second keycap set 310, and the rotational ring 312 combine to form the second extendable interlocking part 404. Note that the input device 104 is shown to include a space key 412 and an enter key 414 that are larger in size compared to other keys on the keyboard switch matrix 210, to enable easier use of these frequently accessed keys.

Figure 5:
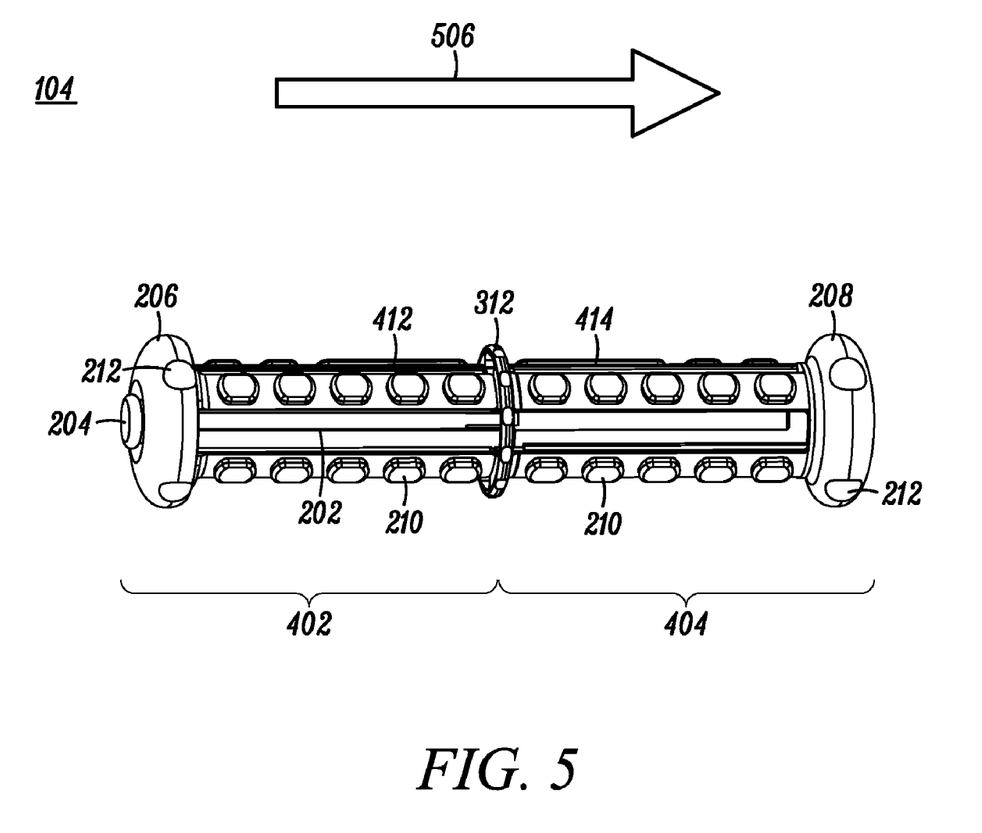
FIG. 5 is a view of the compact input device shown in FIG. 1 in an extended configuration, in accordance with an embodiment.

FIG. 5 is a view of the compact input device 104 shown in FIG. 1 in an extended configuration, in accordance with an embodiment. As described with reference to FIG. 4, the cylindrical surface 202 of the input device 104 is formed by a plurality of extendable interlocking parts 402, 404. Each extendable interlocking part 402, 404 implements part of a QWERTY keyboard on its portion of the keyboard switch matrix 210 shown in FIG. 2. For example, the first extendable interlocking part 402 includes a left-half keyboard matrix (Q W E R T - A S D F G - Z X C V B - 'ESC' 'CapsLock' 'SPACE'), and the second extendable interlocking part 404 includes a right-half keyboard matrix (Y U I O P - H J K L: - N M < > ? - 'ENTER' 'SHIFT' 'DEL'). The first extendable interlocking part 402 and the second extendable interlocking part 404 extend and align to form a complete QWERTY keyboard. Pulling the first end-cap 206 and the second end-cap 208 apart, as shown by an arrow 506, extends the extendable interlocking parts 402, 404. The process of aligning the extendable interlocking parts 402, 404 is further explained in conjunction with FIG. 6.

Figure 6:
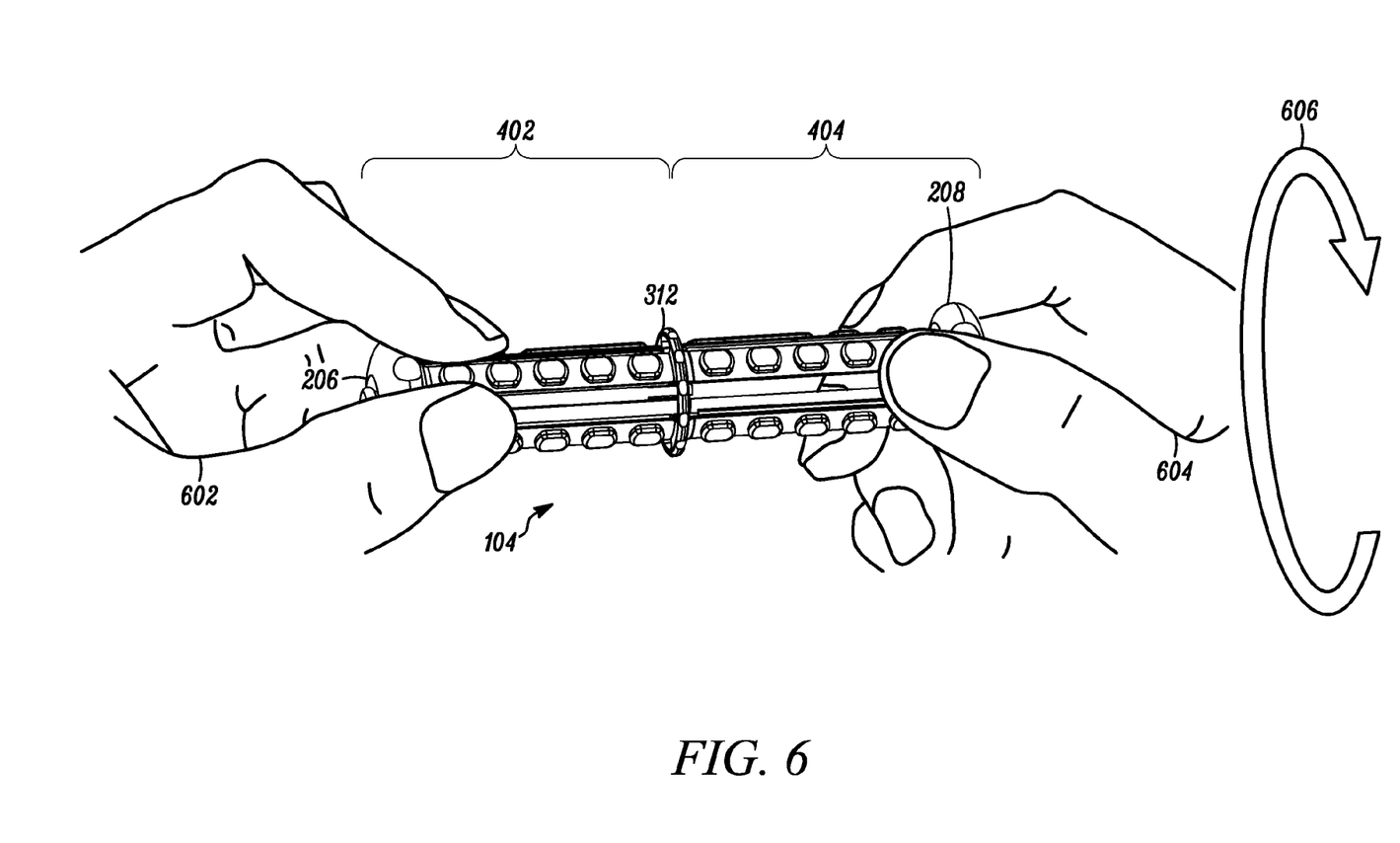
FIG. 6 is a view of the compact input device shown in FIG. 1 in an extended and aligned configuration, in accordance with an embodiment.

FIG. 6 is a view of the compact input device 104 shown in FIG. 1 in an extended and aligned configuration, in accordance with an embodiment. The extendable interlocking parts 402, 404, extend and twist to form a QWERTY keyboard. In accordance with an embodiment, after a user has extended the interlocking parts 402, 404 as shown in FIG. 5, a user's hands 602 and 604 rotate the second interlocking part 404 in a clockwise direction with respect to the first interlocking part 402, as shown by an arrow 606. The indentations 212 (shown in FIG. 2) help the user to maintain a grip on the end-caps 206, 208 so that the extendable interlocking parts 402, 404 can be twisted. Thus, the extendable interlocking parts 402, 404 are twisted to align and form a QWERTY keyboard.

Figure 7:
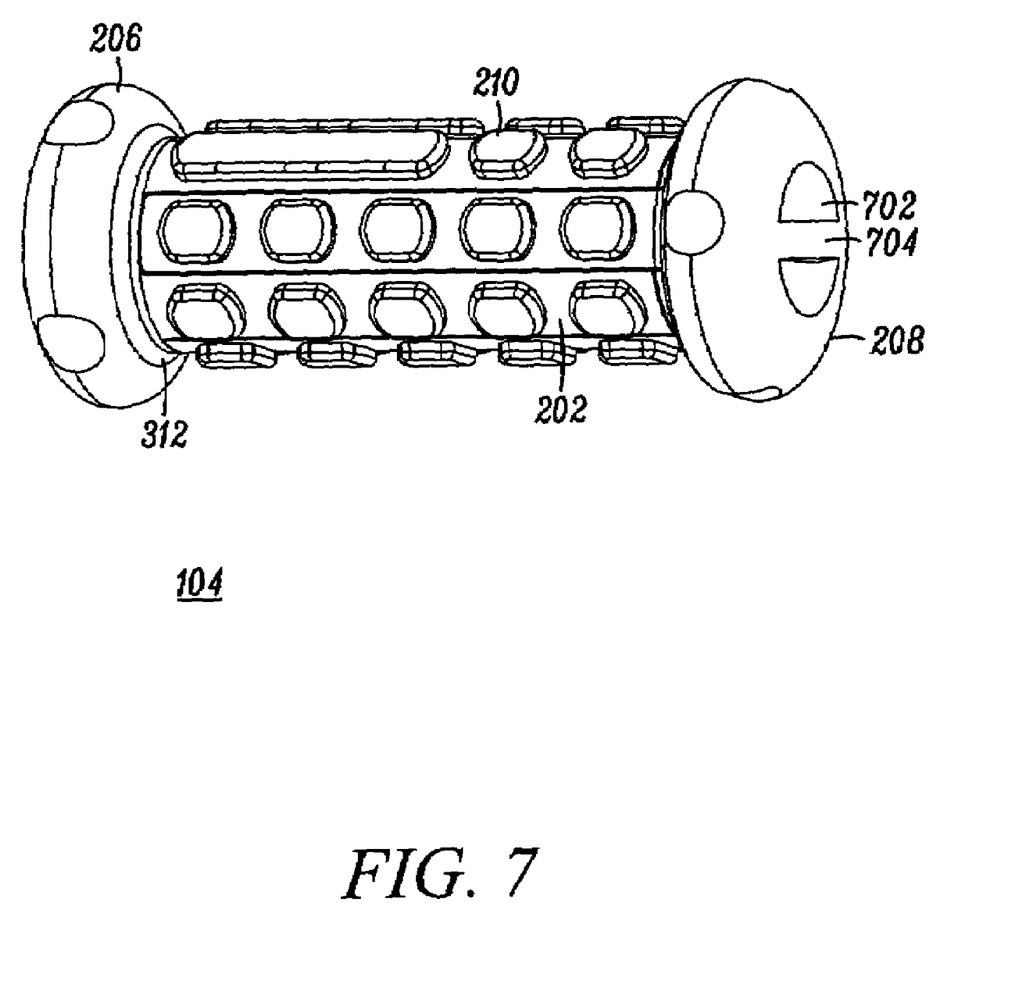
FIG. 7 is a perspective view of the compact input device shown in FIG. 1, in accordance with an embodiment.

FIG. 7 is a perspective view of the compact input device 104 shown in FIG. 1, in accordance with an embodiment. The input device 104 is shown to include, in addition to the elements listed in FIG. 2 and FIG. 3, a depression 702 and a lanyard ring 704 on the second end-cap 208. The lanyard ring 704 allows a user to fasten the compact input device 104 onto a keychain or lanyard to help prevent loss or misplacement of the compact input device.

In accordance with an embodiment, the cylindrical surface 202 is rotatable between the first end-cap 206 and the second end-cap 208. The user can hold the input device 104 by the ends (e.g., the first end-cap 206 and the second end-cap 208) and rotate the cylindrical surface 202, using thumbs, thereby reducing the effort required to rotate the input device 104 when entering data in either the compact configuration or the extended configuration.

Various embodiments of the present invention, as described above, provide an input device for entering data in an electronic device. The disclosed compact input device enters data wirelessly and includes a plurality of extendable interlocking parts. The extendable interlocking parts extend and rotate to form a QWERTY keyboard, which simplifies data entry when the user is already familiar with a QWERTY keypad. Moreover, the small size of the compact input device makes it easy to carry.

It will be appreciated that the apparatus described herein may be comprised of one or more conventional processors and unique stored program instructions that control the one or more processors to implement, in conjunction with certain non-processor circuits, some, most, or all of the functions of the apparatus described herein. The non-processor circuits may include, but are not limited to, a radio receiver, a radio transmitter, signal drivers, clock circuits, power source circuits, and user input devices. As such, these functions may be interpreted as steps of a method to enter data in an electronic device using the input device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, means for these functions have been described herein.

It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In this document, relational terms such as first and second, and the like may be used solely to distinguish one entity or action from another entity or action without necessarily requiring or implying any actual such relationship or order between such entities or actions. The terms "comprises," "comprising," "includes", "including" or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. An input device suitable for entering data in an electronic device, the input device comprising:
   a cylindrical surface having a keyboard switch matrix;
   a first extendable interlocking part forming a first part of the cylindrical surface; and
   a second extendable interlocking part forming a second part of the cylindrical surface.

2. The input device according to claim 1 further comprising at least one navigation element.

3. The input device according to claim 2, wherein the at least one navigation element comprises a second cylindrical surface rotatable between ends of the input device.

4. The input device according to claim 2, wherein the at least one navigation element is one or more of: a navigation button, a navigation wheel, a knob, a joystick, and a touchpad.

5. The input device according to claim 2, wherein the at least one navigation element is located at an end of the cylindrical surface.

6. The input device according to claim 5, wherein the at least one navigation element is located on an end-cap of the cylindrical surface.

7. The input device according to claim 1 further comprising a wireless communication unit for communicating with the electronic device.

8. The input device according to claim 7, wherein the wireless communication unit includes one or more of: a short range wireless communication unit, a wireless local area network communication unit, a radio frequency communication unit, and an infrared communication unit.

9. The input device according to claim 1 further comprising one or more of:
   a microcontroller;
   a transmitter; and
   a power source.

10. The input device according to claim 1, wherein the first extendable interlocking part comprises characters from a left side of a QWERTY keyboard and the second extendable interlocking part comprises characters from a right side of a QWERTY keyboard.

11. The input device according to claim 10, wherein the extendable interlocking parts extend and align to form a QWERTY keyboard.

12. The input device according to claim 1, wherein the keyboard switch matrix is on a convex side of the cylindrical surface.

13. A cylindrical keypad comprising:
a keyboard matrix having more than one row and more than one column, deployed on an outer cylinder body;
an "enter" element deployed on an end-cap;
at least one navigation element; and
a plurality of extendable interlocking parts forming the outer cylinder body, wherein the plurality of extendable interlocking parts extend and align to form a QWERTY keyboard.

14. The cylindrical keypad according to claim 13, wherein the at least one navigation element is one or more of: a navigation button, a navigation wheel, a knob, a joystick and a touchpad.

15. The cylindrical keypad according to claim 13, further comprising:
a microcontroller;
a transmitter; and
a power source.

16. The cylindrical keypad according to claim 13, further comprising at least one keycap over the keyboard matrix.

17. The cylindrical keypad according to claim 13, wherein the "enter" element comprises a key.

18. The cylindrical keypad according to claim 13, wherein the plurality of extendable interlocking parts comprises a first half keyboard matrix and a second half keyboard matrix.

19. The cylindrical keypad according to claim 18, wherein the first half keyboard matrix comprises Q, W, E, R, and T keys, and the second half keyboard matrix comprises Y, U, I, O, and P keys.

* * * * *